(12) United States Patent
Deurenberg et al.

(10) Patent No.: US 8,159,155 B2
(45) Date of Patent: Apr. 17, 2012

(54) LIGHT EMITTING UNIT ARRANGEMENT AND CONTROL SYSTEM AND METHOD THEREOF

(75) Inventors: Peter Hubertus Franciscus Deurenberg, 'S-Hertogenbosch (NL); Erik Nieuwlands, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 271 days.

(21) Appl. No.: 12/669,059

(22) PCT Filed: Jul. 21, 2008

(86) PCT No.: PCT/IB2008/052916
§ 371 (c)(1),
(2), (4) Date: Jan. 14, 2010

(87) PCT Pub. No.: WO2009/013698
PCT Pub. Date: Jan. 29, 2009

(65) Prior Publication Data
US 2010/0194293 A1 Aug. 5, 2010

(30) Foreign Application Priority Data

Jul. 23, 2007 (EP) .................................. 07112931

(51) Int. Cl.
H05B 37/02 (2006.01)
(52) U.S. Cl. ........ 315/360; 315/312; 315/291; 315/224; 315/149; 315/318
(58) Field of Classification Search .................. 315/312, 315/318, 360, 224, 291, 294, 307, 149, 169.1, 315/169.3; 362/227, 612, 613; 345/46, 52, 345/212, 214
See application file for complete search history.

(56) References Cited

U.S. PATENT DOCUMENTS 6,433,483 B1 * 8/2002 Michael et al. ................. 315/76
(Continued)

FOREIGN PATENT DOCUMENTS

EP 1734502 A1 12/2006
(Continued)

OTHER PUBLICATIONS

Muthu et al: "Red, Green, and Blue LEDs for White Light Illumination"; IEEE Journal of Selected Topics in Quantum Electronics, vol. 8, No. 2, pp. 333-338, Mar./Apr. 2002.

*Primary Examiner* — Haiss Philogene
(74) *Attorney, Agent, or Firm* — Mark L. Beloborodov

(57) ABSTRACT

The present invention relates to a control system (12) for controlling the light output of a light emitting unit (10), which light emitting unit comprises at least one light emitting diode (LED) (14) and is adapted to emit light of at least one color, the control system comprising: a sensor unit (18) adapted to detect the light output of the light emitting unit and provide a corresponding feedback signal; and a control unit (22) adapted to control the light output of the light emitting unit based on a comparison between the feedback signal and a corresponding reference signal representing a desired light output, in order to provide an improved light output, wherein the control unit is further adapted to: determine a random switching period; determine on-time(s) for the LED(s) within the random switching period for providing the improved light output; and control energizing of the LED(s) according to the determined period and on-time(s). The present invention also relates to an LED light emitting unit arrangement, and a method for controlling the light output of an LED light emitting unit.

18 Claims, 4 Drawing Sheets

U.S. PATENT DOCUMENTS

| | | |
|---|---|---|
| 7,510,300 B2 * | 3/2009 | Iwauchi et al. ............... 362/231 |
| 7,649,327 B2 * | 1/2010 | Peng .............................. 315/312 |
| RE42,161 E * | 2/2011 | Hochstein ........................ 363/89 |
| 7,999,484 B2 * | 8/2011 | Jurngwirth et al. ........... 315/247 |
| 2005/0117190 A1 | 6/2005 | Iwauchi et al. |
| 2005/0254248 A1 | 11/2005 | Lederer |
| 2007/0273290 A1 * | 11/2007 | Ashdown et al. ............. 315/113 |
| 2008/0231621 A1 * | 9/2008 | Chang et al. ................... 345/211 |
| 2008/0290251 A1 * | 11/2008 | Deurenberg et al. ...... 250/201.1 |

FOREIGN PATENT DOCUMENTS

| | | |
|---|---|---|
| WO | 03032689 A1 | 4/2003 |
| WO | 2006054230 A1 | 5/2006 |
| WO | 2007069149 A1 | 6/2007 |

* cited by examiner

LIGHT EMITTING UNIT ARRANGEMENT AND CONTROL SYSTEM AND METHOD THEREOF

FIELD OF THE INVENTION

The present invention relates to a system for controlling the light output of an LED light emitting unit, an LED light emitting unit arrangement, and a method for controlling the light output of an LED light emitting unit.

BACKGROUND OF THE INVENTION

Light from multiple colored LEDs (e.g. red, green, blue) of a light emitting unit may be mixed to obtain white or colored light.

However, the output (e.g. emitted flux and spectral distribution) of the LEDs will vary due to for instance (differential) ageing and temperature influence, binning, etc. For instance, when creating white light by mixing red, green and blue LEDs, the temperature effects will already result in a visible color difference after a small rise in temperature.

Hereto, a number of models for achieving a stable output (color) of such a light emitting unit have been proposed, for instance temperature feed forward (TFF), color coordinates feedback (CCFB), flux feedback (FFB), or a combination of flux feedback and temperature feed forward (FFB+TFF). In temperature feed forward, a temperature sensor is used for detecting the current temperature of the LEDs (e.g. by measuring the temperature of a common heat sink whereto the LEDs are mounted). By knowing how the LED output varies with temperature, the current temperature can be used to adjust the output of the LEDs to achieve a desired light output of the light emitting unit. In color coordinates feedback, the current LED colors are measured. In flux feedback, the current flux of each LED or LED color is measured. The current flux (feedback) is then compared to a desired flux or output, whereby the output of the LEDs can be adjusted accordingly to achieve a desired light output of the light emitting unit. In flux feedback, a single optical sensor is preferably used to detect the output of the LEDs or LED colors. To this end, for detecting the output of each LED color, the sensor is time-multiplexed over all LED colors. This means that the LED colors are switched on/off in a sequential manner, and the instantaneous output is determined for all switched-on LEDs for each measurement. An exemplary pattern for one frame or period T is illustrated in FIG. 1a. For measurement $m_1$, all LEDs are switched off, and the background light is measured. For measurement $m_2$, the blue LEDs is switched on, and the blue output may be determined by subtracting $m_1$ from $m_2$. For measurement $m_3$, also the green LED is switched on, and the green output may be determined by subtracting $m_2$ from $m_3$. Finally, for measurement $m_4$, also the red LED is switched on, and the red output may be determined by subtracting $m_3$ from $m_4$. In this way, the current output of each LED color may be determined with a single sensor.

The above flux feedback solution (optionally in combination with temperature feed forward) will work fairly well in an environment with constant stray background light falling onto the sensor. Namely, the above model assumes that the background light detected at $m_1$ remains the same for the other measurements $m_2$-$m_4$. However, in some practical cases, the background light is not constant. Imagine for example that another nearby LED light emitting unit (or other pulsed light source or a CRT screen) operates with a frequency which precisely coincides and consequently interferes with measurement $m_4$. That is, the other LED light emitting unit is on at $m_4$, but may be off at the other measurements. This non-constant interference would significantly affect the above model and reduce the color and brightness accuracy.

In an attempt to solve this problem, the international patent application publication no. WO 2006/054230 A1 discloses a control system and method for controlling the light output of a light emitting unit having at least one LED and emitting light of at least one color, which system and method basically uses an output feedback model. In one embodiment, the LEDs of the light emitting units are energized a-periodically, as illustrated in FIG. 1b. By energizing the LEDs a-periodically, the likelihood of significantly reducing interference cased by a periodically pulsed external light source is said to be high.

However, the space (i.e. the frame) within which the LED emission windows can be varied is limited, which means that a pulsed external light source with similar or lower frequency as the light emission unit still may cause interference.

SUMMARY OF THE INVENTION

It is an object of the present invention to at least partly overcome this problem, and to provide an improved control system, light emitting unit arrangement and control method, which in particular can cope with a non-constant environment to provide a stable light output in such an environment.

These and other objects that will be apparent from the following description are achieved by a control system according to appended claim 1, a light emitting unit arrangement according to claim 10, and a control method according to claim 11.

According to one aspect of the present invention, there is provided a system for controlling the light output of a light emitting unit, which light emitting unit comprises at least one light emitting diode (LED) and is adapted to emit light of at least one color, the control system comprising: a sensor unit adapted to detect the light output of the light emitting unit and provide a corresponding feedback signal; and a control unit adapted to control the light output of the light emitting unit based on a comparison between the feedback signal and a corresponding reference signal representing a desired light output, in order to provide an improved light output, wherein the control unit is further adapted to: determine a random switching period; determine on-time(s) for the LED(s) within the random switching period for providing the improved light output; and control energizing of the LED(s) according to the determined period and on-time(s).

The switching period is generally the time frame in which the LEDs are energized or switched on/off for a certain time (on-time) in order to provide a certain output, and a random switching period means that it has a random duration or length. Hereto, the invention is based on the understanding that by randomizing the switching period, the LED(s) may be operated with a random switching frequency, and the likelihood of significantly reducing interference caused by a periodic fixed frequency external light source is high. Also, it may reduce interference to other nearby light sources.

In the above mentioned WO2006/054230, though the LEDs are energized a-periodically, the frame period is non-random and has in PWM a predetermined fixed value or duration.

The random period is preferably determined using an existing random number generator of the control unit, thereby not increasing hardware costs. Alternatively, pseudo random numbers or random number tables or the like could be used.

The present light emitting unit may be any unit comprising one of more LEDs of any type. For instance, the light emitting unit may comprise one or more red, green, and blue LEDs, the output of which may be mixed to white or colored light. Further, applications of the light emitting unit include but is not limited to lighting units, illumination units, lamps, display units (also OLED and PolyLED displays), and backlights. Further, the feedback may be flux feedback, color control feedback, etc. Further, the sensor unit may comprise one or more sensors.

In one embodiment, the random period is $1/f_{RND}$, where $f_{RND}=f_1+f_2*RND$ and $f_1$ is a threshold frequency, $f_2$ is an allowable frequency variation, and RND is a random number between 0 and 1. The threshold frequency is preferably the frequency above which flicker visible for the human eye is avoided. Hereto, the above formula ensures that the (random) frequency never falls below the threshold frequency. The threshold frequency may be in the order of about 500 Hz, and the allowable frequency variation may be in the order of about 500 Hz, resulting in frequency range of about 500-1000 Hz. Instead of the above formula, a different random scheme could be used, for instance a Gaussian distribution around a certain frequency.

In one embodiment, the random period is the period of a pulse width modulation (PWM) signal used to control the at least one LED. In other words, the PWM frequency is randomized. PWM is typically used to control the supply of electrical power to LEDs. Instead of PWM, frequency modulation or other forms of time modulated driving could for instance be used.

In one embodiment, the control unit is further adapted to set the random period at power-up of the light emitting unit. Thus, each time the light emitting unit is turned on, it is assigned a new period, so that any interfering external pulsed light source will not interfere the light emitting unit next time the light emitting unit is switched on. Alternatively or complementary, random periods may be repeatedly set during operation of the light emitting unit. The period length may for instance be changed once every second (1 Hz) or every period, or at random times. In the former case, any interference will only occur for a limited time (e.g. 1 second or period). This is especially advantageous is case the light emitting unit is on for a long time.

In one embodiment, the sensor unit is further adapted to detect the light output of the light emitting unit in accordance with the on-time(s) in the random period. That is, the polling or sampling frequency of the sensor(s) is matched to the present frequency of the LEDs, to maintain timely detection.

In one embodiment, the control unit is further adapted to set a random period for each color, while in an alternative embodiment, all or at least some colors are to be assigned the same period length. In the latter when using the same period for all colors, detection of the individual colors may be more straightforward than in the former.

In one embodiment, feedback signal values above a predetermined value for each color away are during operation filtered away before comparison with the reference signal. A low pass filter may for instance be used for this purpose. In this way, any abnormally high measurement values of the feedback signal, which may be due to the fact that the sensor unit samples the color at the instant that an adjacent pulsed light source is on, are removed. This may further reduce any interference effects.

In another embodiment, feedback signal extreme values for each color for a certain interval are during operation removed before comparison with the reference signal. That is, the highest and lowest measurement values of the feedback signal detected during a certain interval are discarded, which measurement values may be the result of erroneous measurements. This may also reduce any interference effects, and may be effected during operation by the control unit suitably adapted thereto.

According to another aspect of the present invention, there is provided a light emitting unit arrangement, comprising: a light emitting unit comprising at least one LED and adapted to emit light of at least one color; and a control system as discussed above. This aspect exhibits similar advantages as the previously discussed aspect of the present invention.

According to yet another aspect of the present invention, there is provided a method for controlling the light output of a light emitting unit, which light emitting unit comprises at least one LED and is adapted to emit light of at least one color, the method comprising the steps of: detecting the light output of the light emitting unit and providing a corresponding feedback signal; controlling the light output of the light emitting unit based on a comparison between the feedback signal and a corresponding reference signal representing a desired light output, in order to provide an improved light output; determining a random switching period; determining on-time(s) for the LED(s) within the random switching period for providing the improved light output; and controlling energizing of the LED(s) according to the determined period and on-time(s). This aspect exhibits similar advantages as the previously discussed aspects of the present invention. The present method may be carried out using the above control system.

BRIEF DESCRIPTION OF THE DRAWINGS

These and other aspects of the present invention will now be described in more detail, with reference to the appended drawings showing currently preferred embodiments of the invention.

DETAILED DESCRIPTION

Figure 1A:
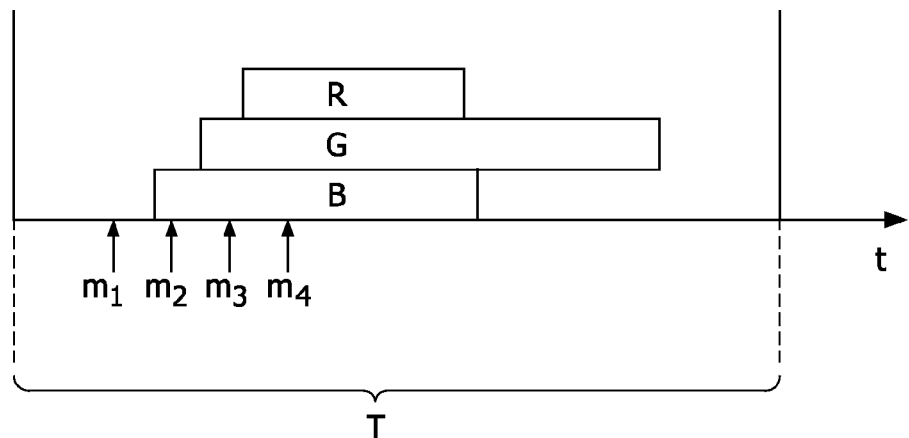
FIGS. 1a-1b are timing diagrams of prior art solutions.
Figure 1B:
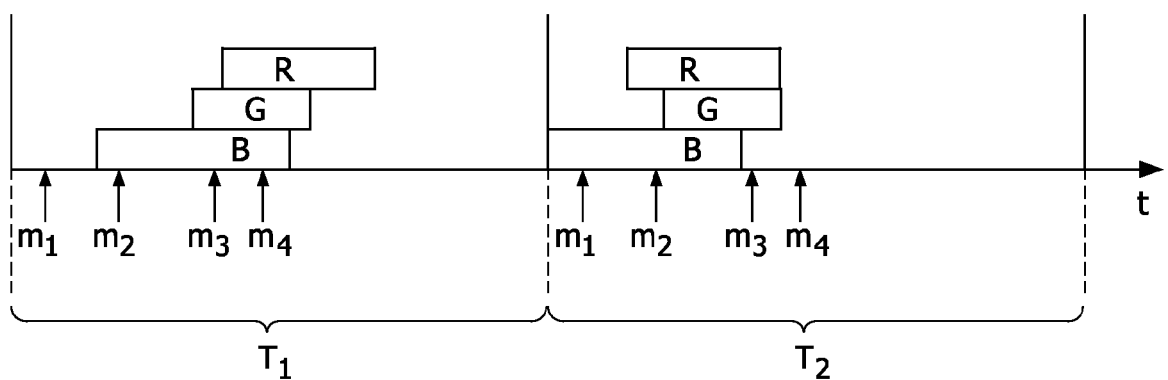
Figure 2:
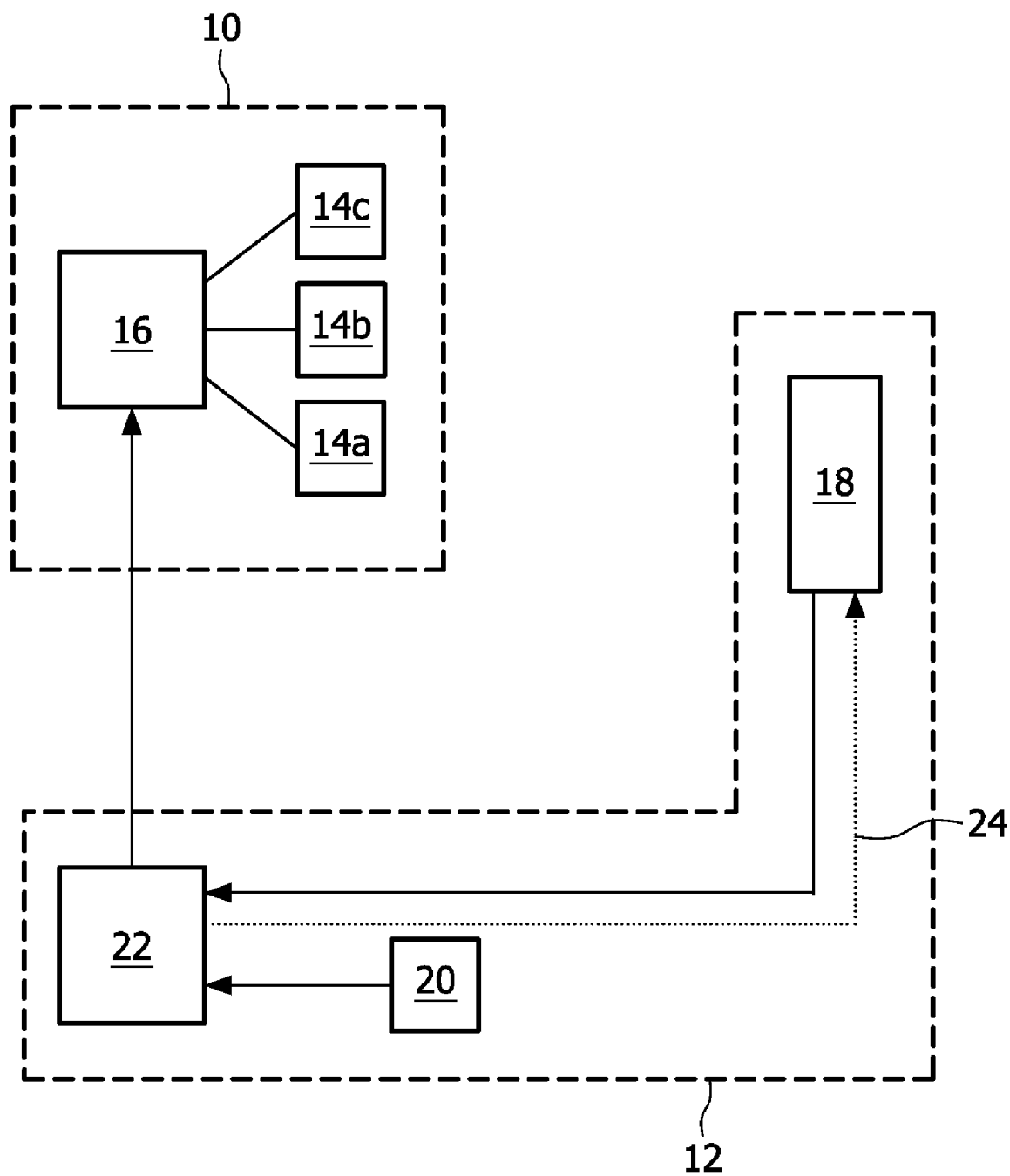
FIG. 2 is a schematic block diagram illustrating a light emitting unit and a control system according to an embodiment of the present invention.

FIG. 2 is a schematic block diagram illustrating a light emitting unit 10 and a control system 12 in a light emitting unit arrangement according to an embodiment of the present invention. The light emitting unit 10 and the control system 12 may be mounted on a printed circuit board (PCB) or the like (not shown).

The light emitting unit 10 comprises an array of LEDs 14, for instance one or more LEDs 14a adapted to emit red light, one or more LEDs 14b adapted to emit green light, and one or more LEDs 14c adapted to emit blue light. The LEDs 14 are connected to a power supply unit 16 for lighting or energizing the LEDs 14.

The control system 12 comprises a sensor unit 18 generally adapted to detect the flux or intensity or radiative power of the light emitted from the LEDs 14 of the light emitting unit 10, and provide a feedback signal indicative of the current or present or instantaneous flux. The sensor unit 18 may comprise an optical sensor, such as a photo-diode, which is time-multiplexed to detect the flux of the different colors (R, G, B). The control system 12 further comprises a reference unit 20 adapted to provide a reference signal representing a desired output flux for each LED color (R, G, B). The reference signal may for instance be based on a desired overall color to be output by the light emitting unit 10, which desired color may be set via a user interface. Additionally, the control system 12 comprises a control unit 22 having one input connected to the sensor unit 18 for receiving the feedback signal, one input connected to the reference unit 20 for receiving the reference signal, and one output connected to the power supply unit 16. The control unit 22 may be a microprocessor or the like. The control unit 22 is generally adapted to control the output of the LEDs 14, via the power supply unit 16 and using PWM, based on a comparison between the current flux indicated by the feedback signal and the desired flux indicated by the reference signal.

More precisely, in an exemplary operation explained with reference to FIG. 3a, the control unit 22 instructs the power supply unit 16 to switch on and off the LEDs 14 of each color during each frame or switching period T by means of a PWM signal for each color. In the first period $T_1$, for measurement $m_1$, all LEDs are switched off, and the background flux is measured by means of the sensor unit 18. For measurement $m_2$, the at least one blue LED 14c is switched on in accordance with the PWM signal for blue, and the blue flux is determined by subtracting $m_1$ from $m_2$. For measurement $m_3$, also the at least one green LED is switched on in accordance with the PWM signal for green, and the green flux is determined by subtracting $m_2$ from $m_3$. Then, for measurement $m_4$, also the at least one red LED is switched on in accordance with the PWM signal for red, and the red output is determined by subtracting $m_3$ from $m_4$. Finally, the LEDs 14 are turned off. The portion of the time period T that the at least one LED of each color is turned on (on-time) is the (PWM) duty cycle which determines the dimming level of the LEDs 14. The current flux measured by the sensor unit 18 for each color R, G, B (the feedback signal) is then compared, by the control unit 22, to the desired flux for each color R, G, B as indicated by the reference signal supplied from the reference unit 20, and the control unit 22 appropriately adjusts the duty cycles if there is a difference between the actual and desired values, in order to provide an improved light output of the light emitting unit 10. Schemes to achieve the time resolved LED output measurements other than that shown in FIG. 3a can be used, as the skilled person will appreciate. The measurements may for instance be spread out over several periods.

According to the present invention, the control unit 22 is further adapted to determine a random length of the switching period T, determine LED on-times within the random switching period for providing the improved light output, and control energizing of the LED(s) according to the determined period and on-times. In other words, the length of the switching period or time slot in which the duty cycle is active is changed. In the context of PWM control, where the PWM period is the inverse of the PWM frequency, this means that the PWM frequency (the frequency of the PWM signals used to control the LEDs 14) is randomized.

Figure 3A:
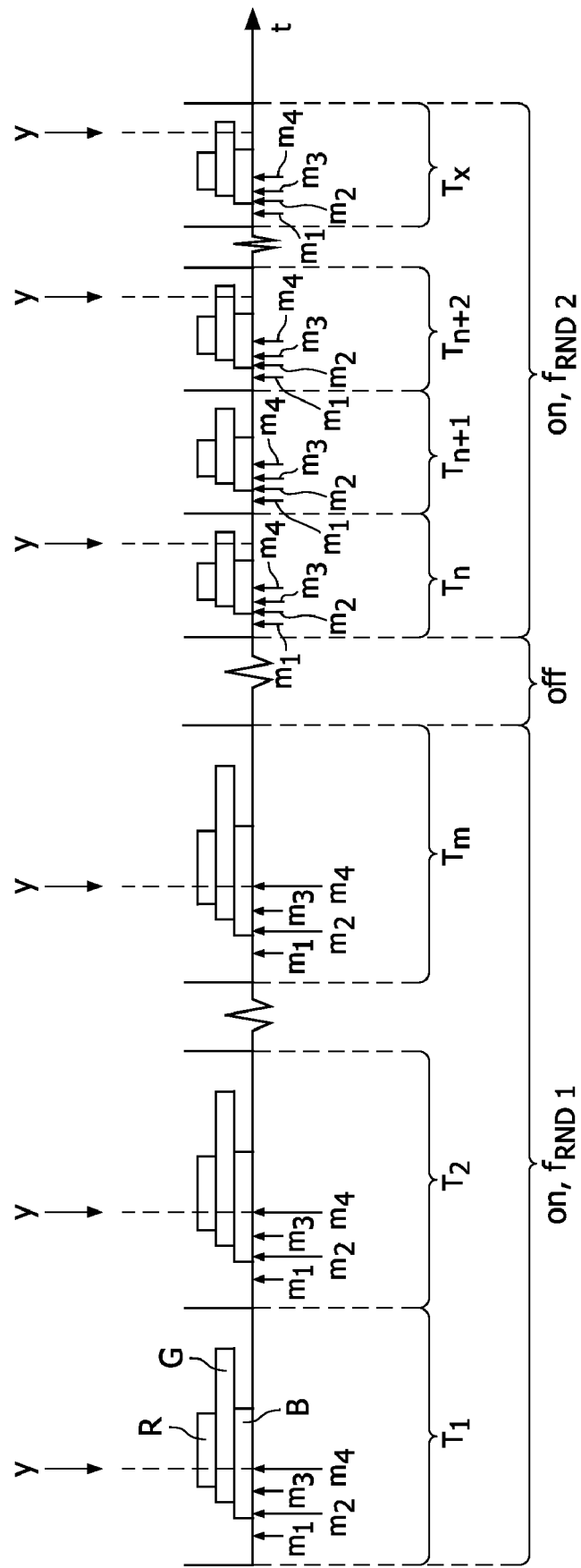
FIGS. 3a-3b are timing diagrams for different embodiments of the present invention.

In the embodiment shown in FIG. 3a, a new random PWM frequency (period) is generated and set every time the light emitting unit 10 is turned on. In FIG. 3a, the light emitting unit 10 is first turned on for periods $T_1$ to $T_m$, whereafter it is turned off. Then it is again turned on for periods $T_n$ to $T_x$. For $T_1$-$T_m$, the control unit 22 generates a random frequency $f_{RND1}$ which it uses as the PWM frequency during $T_1$-$T_m$ for on/off switching of the LEDs 14. On the other hand, for $T_n$-$T_x$, the control unit generates a new random frequency $f_{RND2}$ which it thus uses as the PWM frequency during $T_n$-$T_x$ for on/off switching of the LEDs 14. If $f_{RND2}$>$f_{RND1}$, then each period or time slot $T_n$-$T_x$ is shorter than each period $T_1$-$T_m$, as in FIG. 3a. The duty cycle however remains the same (the pulse width is scaled according to the random frequency/frame), as long as the intended light output of the unit 10 is not changed, whereby the energy or dim-level remains the same. The (new) frequency is preferably supplied to the sensor unit 18 (as indicated by the dotted line 24 in FIG. 2), so that the sensor unit 18 can match its sampling frequency to the frequency of the LEDs 14.

An advantage of the present invention is illustrated by introducing an external pulsed light source which is located nearby the light emitting unit 10 and control system 12. The external pulsed light source periodically emits possibly interfering light with a fixed frequency. Coincidentally, the frequency of the external pulsed light source coincides with $f_{RND1}$, and during $T_1$-$T_m$, the external pulsed light source emits light (denoted 'y') just when the sensor of the sensor unit 18 makes the detection for determining the red flux (measurement $m_4$). Thus, if the sensor unit 18 picks up also the flux of the nearby external pulsed light source, the background light for measurement $m_4$ will be different from the background light of the other measurements. Therefore, the subtraction of $m_3$ from $m_4$ will result in a too high value, and the current red flux will be erroneous during $T_1$-$T_m$, which in turn will cause the control unit 22 to adjust the LEDs 14 wrongly. However, the next time the light emitting unit 10 is turned on (periods $T_n$-$T_x$), it operates at the frequency $f_{RND2}$, whereby the likelihood that the external pulsed light source will interfere as for the previous periods is reduced significantly. The result is a more interference tolerant system.

Figure 3B:
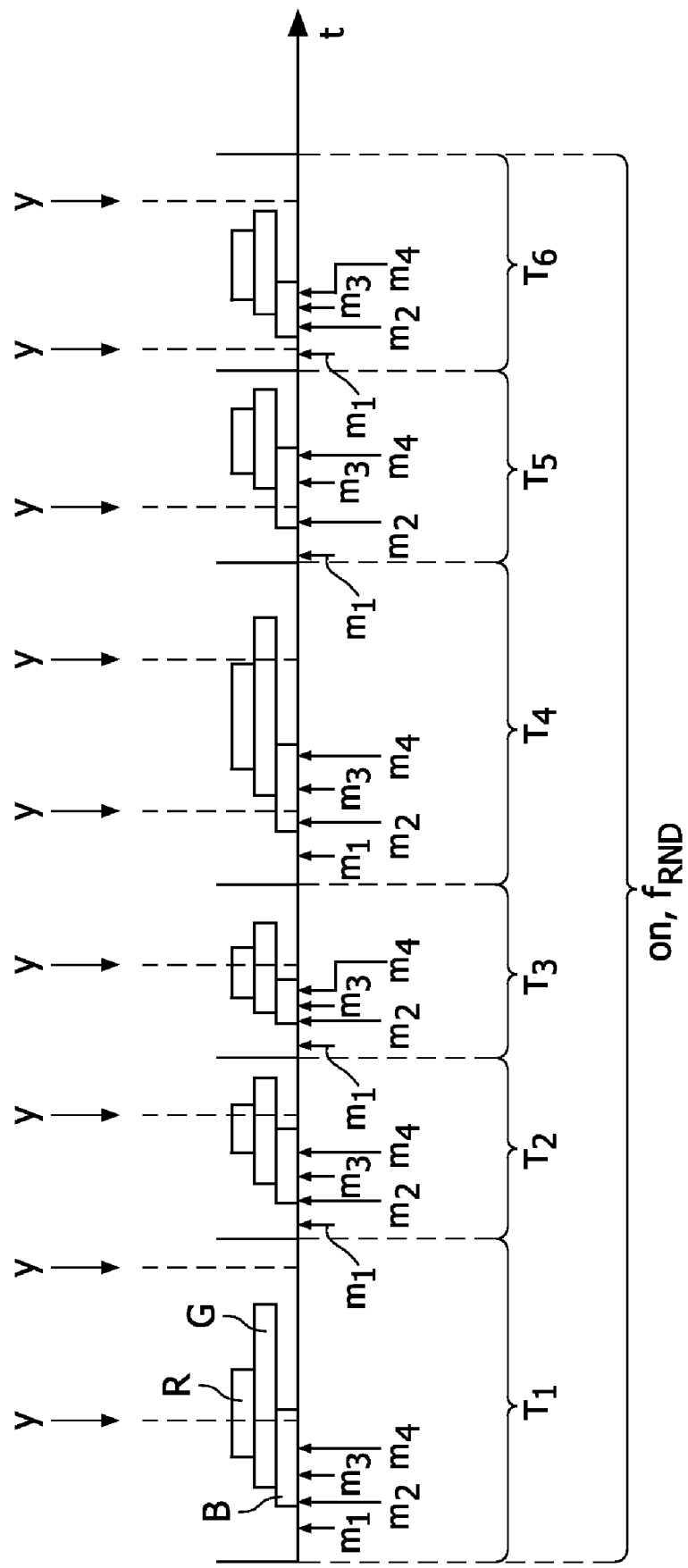

In the embodiment shown in FIG. 3b, new random frequencies are generated and set repeatedly during the time the light emitting unit 10 is turned on. In FIG. 3b, a new random PWM frequency (period) is generated and set for every period T, but it could alternatively be set with a fixed frequency (e.g. 1 Hz, i.e. once every second) or even a random frequency. The new random frequency for each period in FIG. 3b means that the periods $T_1$, $T_2$, . . . have different (random) durations. Thus, should an external pulsed light source interfere with measurements for one period, the likelihood that it will do so for other periods is significantly reduced due to the random PWM frequencies.

The above random frequencies are preferably generated according to the formula $f_{RND}=f_1+f_2*RND$, where $f_1$ is a threshold frequency, $f_2$ is an allowable frequency variation, and RND is a random number between 0 and 1. The threshold frequency $f_1$ is preferably the frequency above which flicker visible for the human eye is avoided. The threshold frequency $f_1$ may be in the order of about 500 Hz, and the allowable frequency variation $f_2$ may be in the order of about 500 Hz, resulting in frequency range of about 500-1000 Hz. The random number RND is preferably generated using an existing random number generator of the control unit 22.

As additional measures to provide an interference tolerant system, a low pass filter (not shown) or the like may be introduced to filter away feedback signal values above a predetermined value for each color before comparison with the reference signal in the control unit 22. The low pass filter is preferably implemented in the control unit 22. In this way, any abnormally high measurement values of the feedback signal, which may be due to the fact that the sensor unit 18 samples the color at the instant that an adjacent pulsed light source is on, are removed. Further, the highest and lowest values of the feedback signal for each color for a certain interval (e.g. a certain time duration or a certain number of periods) may be discarded before comparison with the reference signal in the control unit 22. Such extreme values may be the result of erroneous measurements, the effect of which consequently is removed.

It should be noted that the present control system and light emitting unit arrangement and method can be embodied without any feedback. In this case, the benefit is the reduced interference to other nearby light sources. Also in this case, the sensor unit and associated feedback function of the control unit (or corresponding method steps) can be omitted, and the light emitting unit may comprise one or more (PWM controlled) light sources such as LEDs, TLs, etc.

The person skilled in the art realizes that the present invention by no means is limited to the preferred embodiments described above. On the contrary, many modifications and variations are possible within the scope of the appended claims.

For example, in FIGS. 3a-3b all colors are assigned the same random frequency, but alternatively one random frequency can be set for each color.

Also, instead using PWM to control the supply of electrical power to LEDs as above, frequency modulation could be used, e.g. In frequency modulation, the pulse width has generally the same absolute value, but the period changes. This means that the on-time is fixed, but the off-time varies for a given period. Using the random period of the present invention, the width of both the on-time and off-time is scaled with the same value, thus giving the same energy (duty cycle).

Also, though described in the context of FFB, the present invention can also be implemented in FFB+TFF or CCFB models, e.g.

The invention claimed is:

1. A control system for controlling the light output of a light emitting unit comprising at least one light emitting diode (LED) and configured to emit light of at least one color, the control system comprising:
 a sensor unit configured to detect the light output of the light emitting unit and provide a corresponding feedback signal; and
 a control unit configured to control the light output of the light emitting unit based on a comparison between the feedback signal and a corresponding reference signal representing a desired light output, wherein the control unit is further configured to:
  determine a switching period having a random duration;
  determine one or more on-times for the at least one LED within recurring switching periods; and
  control energizing of the LED(s) according to the determined switching period and the one or more on-time(s).

2. A control system according to claim 1, wherein the random duration is $1/f_{RND}$, wherein
 $f_{RND} = f_1 + f_2 * RND$
 $f_1$ is a threshold frequency,
 $f_2$ is an allowable frequency variation, and
 RND is a random number between 0 and 1.

3. A control system according to claim 1, wherein the random duration is the period of a pulse width modulation (PWM) signal used to control the at least one LED.

4. A control system according to claim 1 wherein the control unit is further adapted to set the random duration at power-up of the light emitting unit.

5. A control system according to claim 1, wherein the control unit is further configured to repeatedly set switching periods during operation of the light emitting unit.

6. A control system according to claim 1 wherein the sensor unit is further configured to detect the light output of the light emitting unit in accordance with the on-time(s) in the switching period.

7. A control system according to claim 1, wherein the control unit is further configured to set a switching period for each color.

8. A control system according to claim 1, wherein feedback signal values above a predetermined value for each color during operation are filtered away before comparison with the reference signal.

9. A control system according to claim 1, wherein feedback signal extreme values for each color for a certain interval during operation are removed before comparison with the reference signal.

10. A method for controlling the light output of a light emitting unit comprising at least one light emitting diode (LED) and configured to emit light of at least one color, the method comprising the steps of:
 detecting the light output of the light emitting unit and providing a corresponding feedback signal;
 controlling the light output of the light emitting unit based on a comparison between the feedback signal and a corresponding reference signal representing a desired light output, in order to provide an improved light output;
 determining a switching period having a random duration;
 determining one or more on-times for the LED(s) within recurring switching periods; and
 controlling energizing of the LED(s) according to the determined switching period and the one or more on-times.

11. A method according to claim 10, wherein feedback signal extreme values for each color for a certain interval are removed before comparison with the reference signal.

12. A method according to claim 10, wherein the random duration is $1/f_{RND}$, wherein
 $f_{RND} = f_1 + f_2 * RND$
 $f_1$ is a threshold frequency,
 $f_2$ is an allowable frequency variation, and
 RND is a random number between 0 and 1.

13. A method according to claim 10, wherein the random duration is the period of a pulse width modulation (PWM) signal used to control the at least one LED.

14. A method according to claim 10, wherein the switching frequency is set at power-up of the light emitting unit.

15. A method according to claim 10, wherein switching periods are repeatedly set during operation of the light emitting unit.

16. A method according to claim 10, wherein the light output of the light emitting unit is detected in accordance with the on-time(s) in the switching period.

17. A method according to claim 10, wherein a random duration is set for each color.

18. A method according to claim 10, wherein feedback signal values above a predetermined value for each color are filtered away before comparison with the reference signal.

* * * * *